Figure 1:
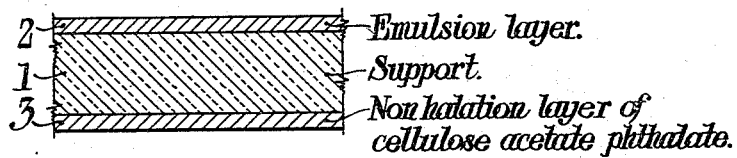

April 10, 1934.   C. J. STAUD   1,954,337
SUPERFICIAL COATING FOR PHOTOGRAPHIC ELEMENTS
Filed Oct. 1, 1932

2 — Emulsion layer.
1 — Support.
3 — Non halation layer of cellulose acetate phthalate.

4 — Overcoating of cellulose acetate phthalate.
2 — Emulsion layer.
1 — Support.

Inventor:
Cyril J. Staud,
By Newton M. Perrin
Attorney.

Patented Apr. 10, 1934

1,954,337

UNITED STATES PATENT OFFICE 1,954,337

SUPERFICIAL COATING FOR PHOTOGRAPHIC ELEMENTS

Cyril J. Staud, Rochester, N. Y., assignor to Eastman Kodak Company, Rochester, N. Y., a corporation of New York Application October 1, 1932, Serial No. 635,778

11 Claims. (Cl. 95—8)

This invention relates to photographic elements such as sensitive plates or films which are provided on one surface with a superficial coating of novel characteristics. Among other uses this coating is especially suitable for non-halation backings, for protective coating, and for a coating to reduce the amount of fog produced when the element is developed.

The invention is based upon the properties of cellulose acetate phthalate in which one carboxyl of the phthalic acid is combined with the cellulose with the elimination of water to form the half ester and the other carboxyl contains a free hydroxyl group, the hydrogen of which is replaceable by the alkali metals. This substance I will refer to as the acid form of cellulose acetate phthalate. The preparation of this compound is fully described in the co-pending application of C. J. Malm and C. E. Waring, Ser. No. 380,252 filed July 22, 1929. I have found that the substance is soluble in non-aqueous organic solvents, such for example as acetone, that it is very resistant to water and is not soluble in it, but that it may be very readily changed either to a soluble form or a highly swollen form which is easily removed. I, therefore, use the acid form of cellulose acetate phthalate dissolved in non-aqueous solvents as the basis of coatings on photographic plates or films, such coatings having certain new and useful applications. Coatings to be described have particular utility as non-halation backings, especially for photographic glass plates and I will first illustrate their use in this connection.

Reference is made to the drawing, the two figures of which illustrate two useful aspects of the invention.

The phenomenon of halation is particularly troublesome with photographic glass plates due to the reflection of light from the back surface of the glass upon which the emulsion is coated. While various types of non-halation backings have been applied to plates for many years, these backings have for the most part eventually proved themselves to be commercially impracticable and troublesome and costly. It has been the nearly universal practice to apply non-halation backings on the plates after the emulsion has been coated on the other side. This was done because most of the backings used would have been badly damaged if the plates were later coated with emulsion. When the non-halation backing was coated after the emulsion had been dried, inspection of the non-halation coating was very difficult especially because of the low intensity of the illumination permissible on the already sensitized plates. By my invention I have now found it possible and convenient to place the backing on the plate before coating the emulsion and the backing so produced has moreover the same desirable properties which the more successful backings hitherto used have had. The invention in its application to non-halation backings, is carried out by dissolving the acid form of cellulose acetate phthalate in an organic solvent, adding suitable coloring matter, and then applying the solution to one side of the glass plate, preferably by spraying. The following illustrate suitable solutions for the purpose:

Example I

The following solution is made up by first dissolving the cellulose acetate phthalate in the solvents and then adding monacetin and the dye.

| | Parts |
|---|---|
| Cellulose acetate phthalate | 6 |
| Acetone | 23 |
| Ethyl alcohol | 45 |
| Ethoxy ethyl alcohol | 13.6 |
| Methoxy ethyl alcohol | 9.1 |
| Monacetin | 1.5 |
| Spirit blue CR Color Index No. 689 | 3.5 |

This solution is applied by spraying one side of glass plates (3, Fig. 1) which are to be subsequently coated with emulsion 2. The sprayed coatings dry rapidly. They may be inspected for defects in full day-light. The plates may now be coated with emulsion 2 on a regular plate coating machine where the fact that they come in contact with warm water during the coating and cold water during setting does not affect the backing 3 because the acetate phthalate is present in the acid form which is quite insoluble in water as previously stated.

The acid form of the cellulose acetate phthalate is easily converted to the sodium salt when the finished exposed plate is placed in an ordinary photographic developer. This sodium salt will not, however, dissolve in the developer with the possible contamination of the same, presumably due to the salting-out effect of the sodium sulfite present. However, when the plate is placed in water the backing will dissolve off quickly and may be removed by mild rubbing with the hand or a small wad of cotton whereupon the backing comes off the plate and quickly dissolves in the wash water. The backing from a 5 x 7 plate may be removed by this procedure in a few seconds. The plate may then be placed in the fixing bath and carried through the remainder of the processes in the usual manner.

If the backing is not all removed in the developer and the fixing bath the sodium salt of the cellulose acetate phthalate will be converted back into the acid form in the acid thiosulfate fixing bath and the backing may not then be removed by subsequent washing. However, if this should occur the backing may be quickly and easily removed by dipping the plate for a few seconds in a solution of sodium carbonate and then placing in wash water. In the highly swollen state in which the cellulose acetate phthalate is produced, it is quickly reconverted to the sodium salt and then becomes once more readily soluble in water.

Example II

The following is also a satisfactory coating material.

|  | Parts |
| --- | --- |
| Cellulose acetate phthalate | 8.8 |
| Acetone | 50 |
| Ethyl lactate | 20 |
| Toluene | 15 |
| Ethyl acetate | 15 |
| Nigrosine Color Index No. 864 | 2 |
| Congo red Color Index No. 370 | 1 |

This solution is coated preferably by spraying as before, the behavior and general treatment being as given under Example I.

Example III

Another example of a satisfactory coating is the following.

|  | Parts |
| --- | --- |
| Cellulose acetate phthalate | 5 |
| Acetone | 75 |
| Ethyl lactate | 25 |
| Nigrosine-spirit soluble Color Index 864 | 2 |

Coating is carried out as described in the previous examples.

Example IV

Another aspect of the invention is the use of coatings of the type described, and which may contain an anti-fogging agent, as superficial or protective layers over an emulsion layer. The cellulose acetate phthalate coating contains a substance which, after the plate is immersed in the developer, is released into the developer from the coating and decreases the amount of developer fog produced. The acetate phthalate coating itself may be completely removed by brief washing between developing and fixing.

A suitable anti-fogging agent for inclusion in a coating of cellulose acetate phthalate is potassium iodide. It has been known for some time that the addition of small quantities of potassium iodide to a developer would decrease the amount of fog produced by extended development. The present invention provides an automatic means of supplying the small quantity of potassium iodide needed.

The following coating solution is used:

| Cellulose acetate phthalate containing more than 35% phthalyl | grams | 10 |
| --- | --- | --- |
| Acetone | c. c | 100 |
| Ethyl lactate | c. c | 40 |
| Toluene | c. c | 30 |
| Ethyl acetate | c. c | 30 |
| Potassium iodide | mg | 50 |

Figure 2:
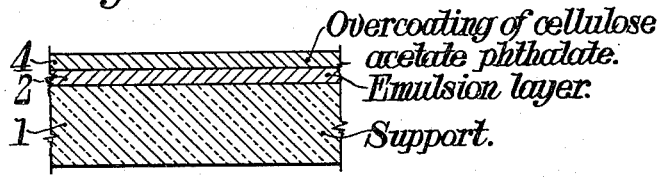

This solution is coated (4, Fig. 2) over the ordinary emulsion coating 2 of a plate or film either by dipping, by spraying, or by a regular coating machine. Since this coating 4 is applied from organic solvents it does not have any solvent action on the gelatin emulsion 2 and apparently no appreciable quantities of potassium iodide diffuse into the silver halide emulsion with any resulting harmful reaction between this potassium iodide and the silver bromide present in the emulsion.

Other anti-fogging agents suitable for use in overcoatings of the type just described are the iodo-aliphatic acids, especially the lower members of the series. Of these ido-acetic acid and Beta-iodo-propionic acid are particularly useful.

These anti-fogging agents which I have particularly described appear to exert their beneficial influence through certain reactions of the iodide ion. The iodo-aliphatic acids produce, by interaction in the developer, a certain amount of sodium iodide in the layer over, and adjacent to, the emulsion. In the case of potassium iodide the soluble iodide is of course already formed. The soluble iodide present in the immediate vicinity of the silver halide grain restrains the formation of developer fog or emulsion fog, or both. The exact mechanism of the effect is not known.

The type of coating which is the subject of this invention has also several favorable characteristics. It is as resistant to moisture as the ordinary support of a cellulose derivative and, therefore, "seals in" the gelatin emulsion to a certain extent and protects it from the action of moisture. It also serves as a protective coating to avoid scratches and abrasion marks on films or plates and would have this useful function, if the anti-foggant were omitted.

When the plate has been exposed and placed in the developer the cellulose acetate phthalate is converted to the sodium salt which is highly swollen by the developer but which will not be removed, apparently, as previously stated, due to the action of the sodium sulfite present, but through which the developer will diffuse at a more rapid rate than through the gelatin. The addition of this coating, therefore, does not decrease the rate of development, since the rate of diffusion through the gelatin is the controlling factor.

If the plates are left in running water for 1 to 2 minutes between the developing and fixing the overcoating layer will be completely dissolved. However, if it is desirable to give but a short rinse between these two operations, plates may be fixed in the usual manner in acid sodium thiosulfate and the residual overcoating removed by dipping the plates in a dilute sodium carbonate solution for a few seconds. On subsequent washing the cellulose derivative is found to dissolve easily and completely.

Coatings of cellulose acetate phthalate may be also applied as top coatings over emulsion layers without the addition of anti-fogging agents as merely protective layers to prevent abrasion.

In still another variation of the invention, an anti-fogging material may be incorporated in a non-halation backing. For this purpose, for example, potassium iodide as an anti-fogging agent is added to a suitable coating solution containing a non-actinic dye, and the mixture is coated on the rear face of the support as already described. A satisfactory coating solution is:

*Example V*

| | | |
|---|---|---|
| Cellulose acetate phthalate | grams | 5 |
| Acetone | c. c. | 90 |
| Ethyl lactate | c. c. | 25 |
| Nigrosine-spirit soluble Color Index 864 | grams | 2 |
| Potassium iodide | mg. | 40 |

The general treatment and action of this coating will be clear from the preceding. Other antifogging substances than potassium iodide may be used of course.

It is to be noted that if the phthalyl content of the cellulose acetate phthalate to be used is below 30% the rapidity of solution in water of the sodium salt produced is decreased and in that case it is advisable to add a water soluble compound to the coating to increase the rate of penetration of the alkali and also to improve the rapidity with which the coating can be removed in wash water between developing and fixing. I have found that monacetin is satisfactory for this purpose though similar compounds may be used, of course. As higher phthalyl contents are employed, or partially hydrolyzed cellulose acetate phthalates in which a portion of the acetyl content has been removed, increasing the hydroxyl present, the need for a compound of the type of monacetin to bring about permeability is obviated and the cellulose compound alone may be used.

It is understood, of course, that other alkalies than sodium carbonate will function in changing the acid form of cellulose acetate phthalate over to the water soluble or swollen form. Among these other alkalies are ammonium hydroxide, moderate concentrations of sodium and potassium hydroxides, potassium carbonate and pyridine.

A number of variations may be made in the coating solutions to be employed, particularly as to the solvents used, and also in other features of the invention. All of these I consider as included in my invention as expressed by the following claims.

What I claim is:

1. A sensitive photographic element comprising a superficial coating containing the water-insoluble acid form of cellulose acetate phthalate.

2. A sensitive photographic element comprising a support, a sensitive layer on one surface thereof and an anti-halation coating on the other face of the support, said coating containing the water-insoluble acid form of cellulose acetate phthalate and suitable coloring matter.

3. A sensitive photographic element comprising a support, an emulsion layer and a protective coating over the emulsion layer, said coating containing the water-insoluble acid form of cellulose acetate phthalate.

4. A sensitive photographic element comprising a support, an emulsion layer and a superficial layer over the emulsion layer, said superficial layer containing the water-insoluble acid form of cellulose acetate phthalate and a substance which on being subsequently released into the developer decreases the amount of developer fog produced.

5. A sensitive photographic element comprising a support, a sensitive emulsion layer and a superficial layer over the emulsion layer, said superficial layer containing the water-insoluble acid form of cellulose acetate phthalate and an iodine compound which is capable, during development, of furnishing a soluble iodide.

6. A sensitive photographic element comprising a support, an emulsion layer and a superficial layer over the emulsion layer, said superficial layer containing the water-insoluble acid form of cellulose acetate phthalate and potassium iodide.

7. A sensitive photographic element comprising a support, a sensitive layer on the one surface thereof and a non-halation coating on the rear face of the support, said coating containing the water-insoluble acid form of cellulose acetate phthalate, a non-actinic dye, and a substance which on being subsequently released into the developer decreases the amount of developer fog produced.

8. A sensitive photographic element comprising a support, a sensitive layer on the one surface thereof and a non-halation coating on the rear face of the support, said coating containing the water-insoluble acid form of cellulose acetate phthalate, a non-actinic dye and potassium iodide.

9. The method of providing a photographic element with a non-halation coating which comprises dissolving the water-insoluble acid form of cellulose acetate phthalate in a non-aqueous solvent, adding a suitable non-actinic dye, and applying the resulting solution to the rear face of the support of said element.

10. The method of providing a photographic element with a non-halation coating which comprises dissolving the water-insoluble acid form of cellulose acetate phthalate in a non-aqueous solvent, adding a suitable non-actinic dye, and applying the resulting solution to the rear face of the support of said element by spraying.

11. The method of applying a non-halation coating to a photographic plate and removing the same after development which comprises spraying the rear face of the glass with a solution containing non-aqueous solvents, the acid form of cellulose acetate phthalate and a suitable non-actinic dye, and rendering the coating partly soluble and soft by a conversion to the alkali metal salt of the cellulose acetate phthalate by the presence of a suitable alkali in the developer, and later removing the coating.

CYRIL J. STAUD.